United States Patent
Büermann

(10) Patent No.: US 6,585,584 B2
(45) Date of Patent: Jul. 1, 2003

(54) CLEANING ASSEMBLY

(75) Inventor: Martin Büermann, Haunsheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/884,334

(22) Filed: Jun. 19, 2001

(65) Prior Publication Data

US 2002/0006816 A1 Jan. 17, 2002

(30) Foreign Application Priority Data

Jun. 20, 2000 (DE) .......................... 100 30 262

(51) Int. Cl.⁷ ................................ A01F 12/32
(52) U.S. Cl. .......................... 460/101; 460/97
(58) Field of Search ............... 460/97, 101, 102, 460/5, 8; 209/394; A01F 12/44

(56) References Cited

U.S. PATENT DOCUMENTS

| | | | |
|---|---|---|---|
| 1,383,918 A | | 7/1921 | Fadness |
| 4,502,493 A | * | 3/1985 | Jones et al. .................. 209/394 |
| 4,712,568 A | * | 12/1987 | Strong et al. ................ 209/394 |
| 4,770,190 A | | 9/1988 | Barnett ....................... 130/27 Z |
| 4,897,027 A | | 1/1990 | Szaplonczay et al. ....... 425/117 |
| 5,586,033 A | | 12/1996 | Hall ........................ 364/424.07 |
| 5,984,777 A | * | 11/1999 | Kuchar ........................ 460/101 |

FOREIGN PATENT DOCUMENTS

| | | | |
|---|---|---|---|
| DE | 71 45 564 | 11/1973 | |
| DE | 198 24 462 | 12/1999 | |
| DE | 19824462 A1 | * 12/1999 | ............ A01F/12/34 |
| DE | 1 068 793 | 1/2001 | |
| DE | 100 25 030 A1 | 11/2001 | |
| JP | 11018559 A | 1/1999 | |

* cited by examiner

Primary Examiner—Robert E. Pezzuto
Assistant Examiner—Meredith C. Petravick

(57) ABSTRACT

A cleaning assembly for an agricultural combine comprises a cleaning shoe with at least one sieve. The sieve is provided with adjustable blades. The sieve is provided with an adjustment element for adjusting the position of the blades. A driving element is connected to the adjustment element. The sieve can be removed from the cleaning shoe without disassembling the connection between the drive element and adjustment element. The connection is automatically disengaged when the sieve is being removed from the cleaning shoe and automatically engaged when the sieve is being reinstalled in the cleaning shoe.

12 Claims, 2 Drawing Sheets

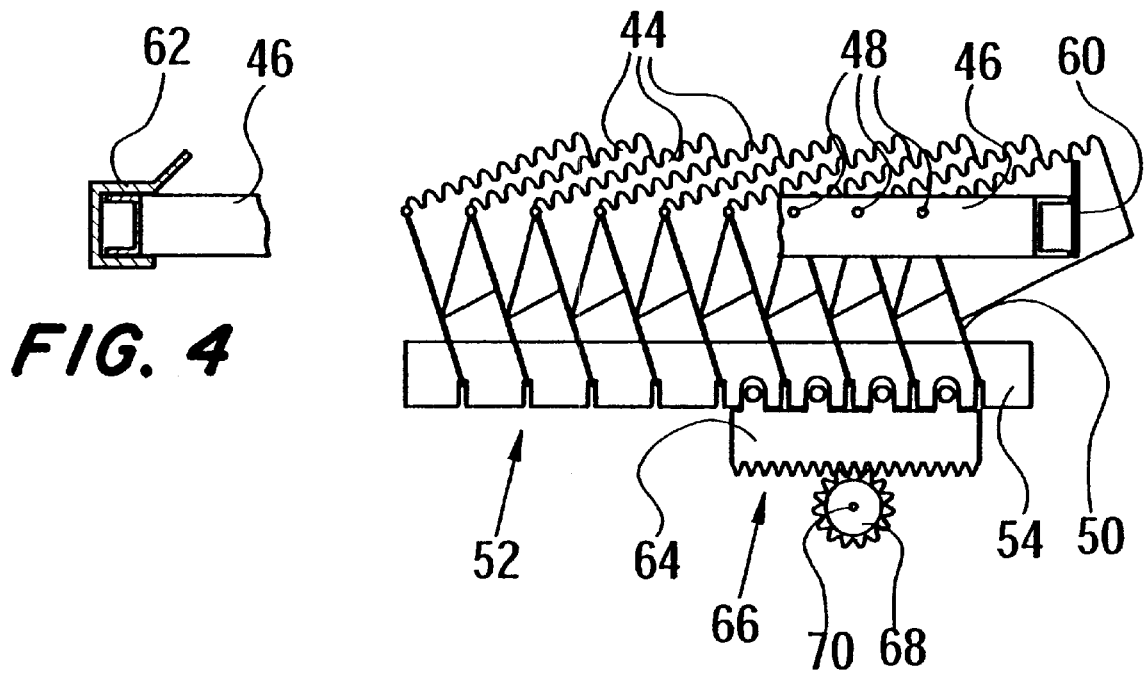
FIG. 2
FIG. 4
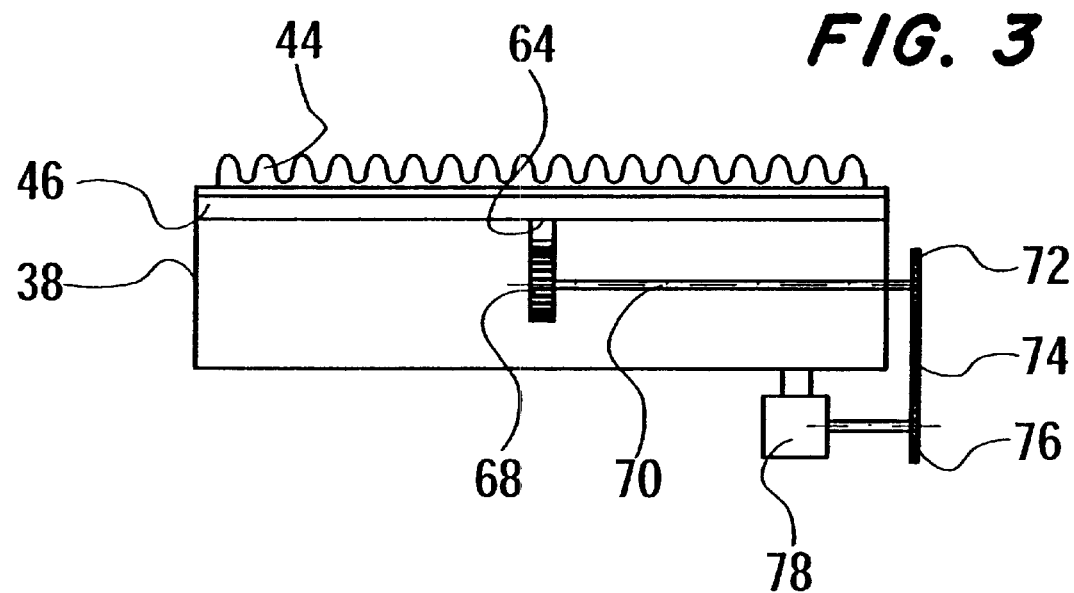
FIG. 3

CLEANING ASSEMBLY

FIELD OF THE INVENTION

The present invention is directed to a cleaning assembly for an agricultural combine, wherein the cleaning shoe is provided with a sieve having adjustable blades. The position of the blades is adjusted by an adjustment element that is coupled to a drive element located on the cleaning shoe. The sieve is removeably mounted to the cleaning shoe so that the sieve can be removed without disassembling the connection between the drive element and adjustment element.

BACKGROUND OF THE INVENTION

In a combine some chaff and straw is mixed with the grain after threshing and separation. The cleaning assembly removes these contaminants from the grain. In most combines, the cleaning assembly contains three main components: a blower, an upper sieve and a lower sieve. The blower has its own housing, whereas the upper sieve and lower sieve are mounted on a cleaning shoe.

An adjustable sieve is designed from a series of transversely extending blades with rows of teeth. Each of these blades is fastened to a cranked shaft that has a crank arm engaged with an axially extending adjustment bar. All blades are moved simultaneously by axial displacement of the adjustment bar.

The adjustable upper sieve and lower sieve are adjusted as a function of the conditions of the harvested product. The blades of the upper sieve are opened or closed far enough so that the grain falls through the upper sieve before it travels the length of the upper sieve. If the upper sieve is opened too wide, the lower sieve can be overloaded with chaff. When the upper sieve is not opened wide enough and the grain cannot be separated from the chaff and straw, this reaches the upper sieve extension, which can lead to overloading of the return. If the grain cannot be separated there, either, as a result of a sieve being opened too widely, the grain is returned to the field over the end of the sieve as cleaning losses. The blades of the lower sieve must be opened wide enough to permit the grain to fall easily through them, but not wide enough that the straw and chaff can fall through.

In many combines, an operator, depending on the actual type of crop and the harvesting conditions, must reach between the side walls on the back side of the thresher in order to make these adjustments via hand levers mounted on the sieve. This makes the adjustments cumbersome and time-consuming. A common feature of hand-operated adjustment devices with linkages is that the operating elements are mounted in the cleaning shoe to avoid unnecessary deflection and therefore form a clogging hazard, that can adversely affect air conduction through the cleaning shoe.

Various remotely operated adjustment mechanisms have been proposed. U.S. Pat. No. 4,897,027 A discloses a cable drive mechanism that permits an operator to adjust the blade angle from an operator's position. U.S. Pat. No. 5,586,033 A discloses an apparatus that drives the blades via a motor-driven cable mechanism for automatic control. A drawback of these sieve adjustments lies in the play of the operating devices, which leads to imprecise sieve adjustment. A relatively high disassembly expense is also required when the sieves, for example, must be disassembled for cleaning purposes.

A self-propelled combine is described in DE 198 24 462, in which the removable blade sieves are equipped with a spring that automatically brings the blades into the closed or open position. A lever rigidly mounted on the combine comes to bear on an adapter mounted with the adjustment bar of the blades when the sieves are incorporated in the cleaning shoe. The lever can therefore displace the adapter against the action of the spring in a first direction, in order to adjust the blades. If the lever is adjusted in the opposite direction, the adapter is pushed back by the action of the spring. This solution permits the sieve to be removed from the cleaning shoe without loosening a connection between the lever and the adapter. A shortcoming is that the sieves can no longer be closed or opened when they operate so sluggishly from contaminants or mechanical imprecision that the spring can no longer move the adjustment bars. It is also possible that the spring can fail because of barley glumes that are situated between the spring windings, so that the sieve can no longer be closed even when the blades are readily accessible.

SUMMARY OF THE INVENTION

It is an object of the present invention to provide an improved cleaning assembly having an easily removeable sieve with adjustable blades.

The invention refers to a cleaning assembly for a combine comprising a cleaning shoe having a removable sieve. The sieve has a frame with adjustable blades. The blades of the sieve can be moved by an adjustment element arranged on the sieve. The adjustment element is movable by a drive element that is mounted on the cleaning shoe. The drive element is not removable from the cleaning shoe with the sieve. The drive connection between the drive element and adjustment element is automatically disengaged when the sieve is disassembled and automatically reengaged when the sieve is reengaged. The drive element is set up so that it can drive the adjustment element in two directions. The adjustment element is therefore moved by the drive element in a first direction to open the blades and in the opposite direction, in order to close the blades. The drive element is therefore set up to actively drive the adjustment element in two opposite directions. A spring to return the adjustment elements is not required.

In this manner, the position of the blades is adjusted exclusively by the drive element, so that the spring is spared and the sieve remains adjustable even when the blades are difficult to access.

The drive connection between the drive element and the adjustment element can be any number of connections that readily disengage and engage. For example, the drive element may comprise a friction wheel that cooperates with a friction surface on the adjustment element. Such a friction drive system may encounter slippage in the drive element driving the adjustment element. A positive drive power transmission is preferred. For example, the drive element may comprise a gear that cooperates with a gear or rack on the adjustment element. The gear can be a standard spur gear or a worm gear. In the illustrated preferred embodiment, the adjustment element is provided with a rack, which is moved axially by the drive element that comprises a gear. The gear is mounted to the cleaning shoe. The described power transmission mechanisms automatically disengage on removal of the sieve from the cleaning shoe without additional assembly demands, and automatically reengages on incorporation of the sieve back into the cleaning shoe.

The sieves of the cleaning assembly are provided with a number of blades that normally extend transversely to the direction of travel of the combine. Each blade is generally equipped with a cranked shaft, which has a crank arm in order to adjust the angular position of the blade. The crank arms are accommodated in slots situated in an axially extending (i.e., along the forward direction of travel) adjustment bar. The angle of the blades and the opening produced between them is varied by movement of the adjustment bar forward or backward, produced by the adjustment element. However, it is also conceivable to rotate the adjustment bar and to convert the rotation to a displacement movement of the blade by appropriate mechanisms.

The drive element can be driven by an electrically, pneumatically or hydraulically powered motor, although a manual drive is also conceivable. The latter can be effected, in particular, from the operating cabin via appropriate power transmission elements. If the drive element is motorized, the motor can be controlled manually by appropriate switches in the operator's cabin or by an automatic control or regulation device.

For reasons of flow, it is advisable to arrange as few elements as possible of the drive train of the drive element in the interior of the cleaning shoe. In a preferred variant, only the drive element and a shaft connected to it are therefore arranged in the cleaning shoe. The other elements of the drive train are then situated outside of the cleaning shoe.

The sieve is preferably fastened in the cleaning shoe by a retaining element. After removal of the retaining element, the sieve can be removed out the rear of the cleaning shoe.

Removal and insertion of the sieve can be effected by the drive element. After the retaining element has been removed, the drive element is placed in operation, which initially brings the blades into the closed or open position. If the blades are closed or opened, the adjustment element preferably cooperates with a stop so as not to unduly load the blades or even deform them. Since the retaining element was removed, the entire sieve is now removed from the cleaning shoe. Insertion of the sieve occurs in the opposite direction, also through the drive element.

BRIEF DESCRIPTION OF THE DRAWINGS

FIG. 2 is a perspective side view of the sieve and the corresponding adjustment mechanism.

FIG. 3 is a rear view of the sieve and the adjustment mechanism.

FIG. 4 is a partial rear view of a portion of the sieve and the side rail of the cleaning shoe.

DETAILED DESCRIPTION

Figure 1:
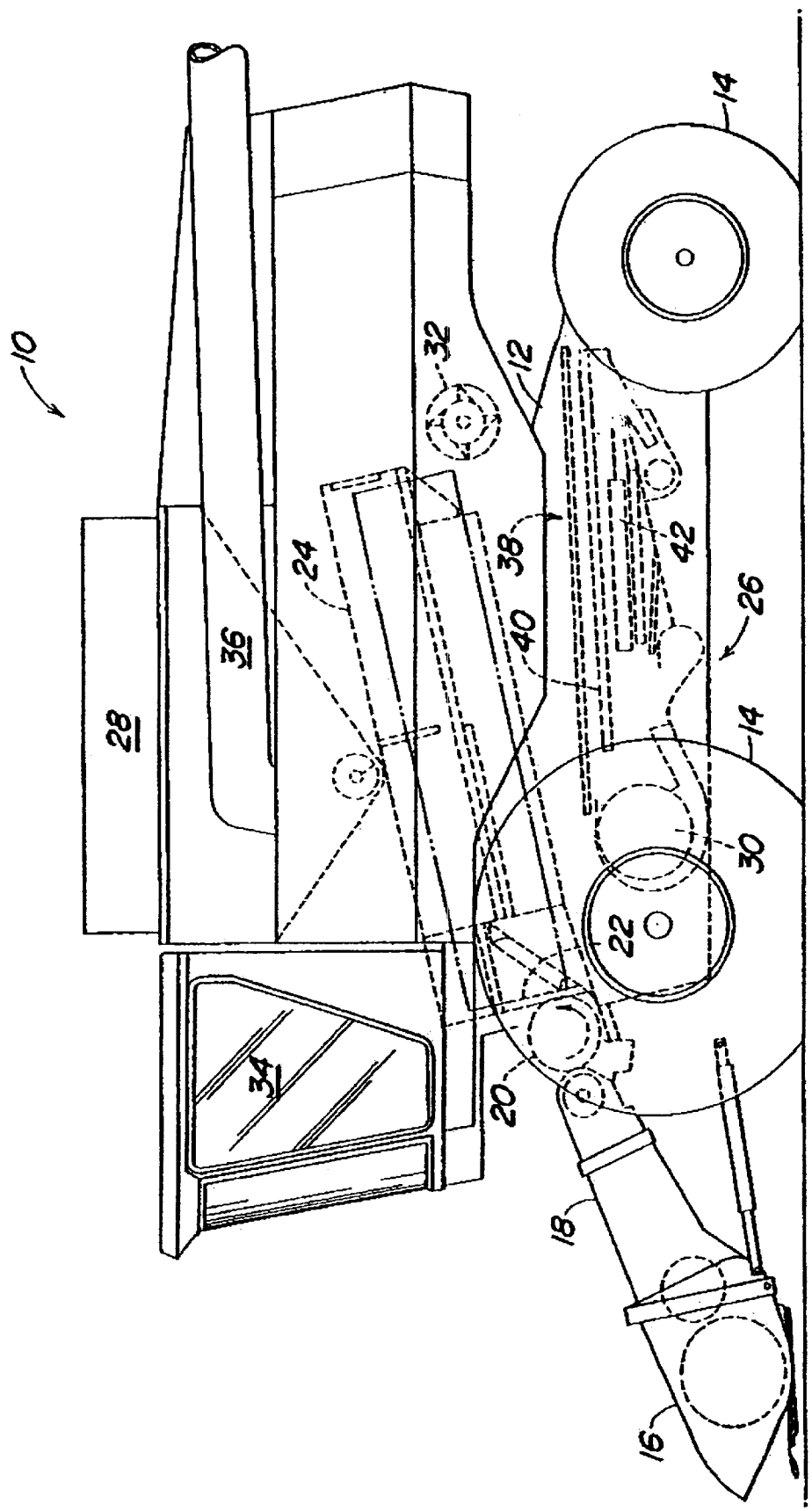
FIG. 1 is a semi-schematic side view of an agricultural combine, in which the threshing, separation and cleaning assemblies are shown.

In the following disclosure the term axial direction means the longitudinal direction of travel of the combine. FIG. 1 shows a side view of a self-propelled agricultural combine 10. The combine 10 comprises a support structure 12 with wheels 14. The support structure 12 comprises two axially extending side walls, between which the different crop processing devices for the harvested product are arranged. A cutting mechanism 16 extends forward from combine 10, which feeds the harvested product to feeder house 18. The feeder house 18 guides the harvested product to the threshing, separation and cleaning assemblies, which are arranged between the side walls of the combine 10. Although the present invention is disclosed as applicable on a rotary combine, it can also be used on any combine having a cleaning assembly.

In the combine depicted, the feeder house 18 guides the harvested product to a transversely extending accelerator beater 20, which feeds the product through an inlet transition section 22 to an axial threshing and separation assembly 24. The grain and chaff are fed by the axial threshing and separation assembly 24 to a cleaning assembly 26. The cleaning assembly 26 feeds the clean grain back to a grain tank 28 and the chaff is blown by the cleaning blower 30 out the rear of combine 10. The harvested product that is neither grain nor chaff is fed by the axial threshing and separation assembly 24 to a transversely arranged discharge beater 32 that conveys the material out onto the field out the rear of the combine 10. Clean grain is temporarily stored in the grain tank 28 and can be unloaded by an operator from the operator's cab 34 actuating an unloading auger 36. The threshing and separation assembly 24 and the cleaning assembly 26 are arranged between the side walls of the support structure 12.

The cleaning shoe 38 is equipped with an upper sieve 40 and a lower sieve 42. The upper sieve 40 and the lower sieve 42 are provided with transversely running adjustable blades 44, which are shown in FIG. 2. The blades 44 are fastened in a rectangular frame 46 that is supported by the side walls of the cleaning shoe 38. As shown in FIG. 2, each of the blades 44 is equipped with a cranked shaft 48, which has a crank arm 50. The crank arm 50 is arranged in a slot 52 of an axial adjustment bar 54. By axial movement of the upper and lower adjustment bars 54, the angular position of all blades 44 of the upper sieve 40 or all blades 44 of the lower sieve 42 can be adjusted. The adjustment bar 54 is mounted movably on frame 46 (in a manner not further shown in the figures). If the adjustment bar 54 is moved in the direction of travel, i.e., from right to left in FIG. 2, or vice versa, the cranked shafts 48 of blades 44 are rotated in their bearings on frame 46 and the position of the blades 44 is adjusted. The spacing between adjacent blade tips is then changed. Displacement of the adjustment bar 54 to the left causes a reduction in the spacing and therefore closure of sieve 40 or 42. On the other hand, displacement of the adjustment bar 54 to the right results in opening of the blade tips and thus opening of the sieve 40 or 42.

An adjustment element 64, whose bottom is equipped with a rack 66, is bolted onto the adjustment bar 54. However, it is also possible to appropriately design the adjustment bar 54 itself to have an integral rack. The longitudinal direction of the rack 66 runs in the direction of travel so that the individual teeth run transverse to the direction of travel. A gear 68 meshes with the rack 66 of adjustment element 64, which is rotatable on a shaft 70 running transverse to the direction of travel. Rotation of gear 68 causes displacement of the adjustment element 64 in or opposite to the direction of travel (leftward or rightward in FIG. 2). In that way, the spacing between adjacent blade tips is achieved.

In order to prevent the rack 66 (or a toothed adjustment bar 54) from being clogged with contaminants during operation, the rack 66 can be encapsulated. The encapsulation would have overlapping flexible sealing lips slot on the bottom. The encapsulation would be attached to the rack 66 and removed with sieves 40 and 42 from the cleaning shoe 38. From the standpoint of flow, the encapsulation should be designed to be as small as possible. As an alternative or in addition, it is conceivable to occasionally place the gear 68 in rotation in order to run the length of rack 66 and remove the contaminants. So as not to adversely affect operation of the combine 10, a sensor can be provided that recognizes the absence of product flow, for example, during turning at the end of a field, or during road travel, and places motor 78 in operation.

It is apparent, with reference to FIG. 3, that the gear 68 is driven via a drive train, which comprises shaft 70, a first pinion 72, a chain 74, a second pinion 76 and a motor 78. The first pinion 72 sits outside the cleaning shoe 38 on shaft 70 arranged transverse to the direction of travel. The chain 74 travels around the two pinions 72 and 76. The motor 78 drives the second pinion 76. Instead of chain 74, a smooth or toothed belt could also be used that cooperates with the corresponding pinions or sheaves 72 and 76. The motor 78 is therefore set up to rotate gear 68 via the drive train. The motor 78 is preferably an electric motor. It can be controlled manually or by an automatic control or regulation device of the cleaning assembly 26. It should also be noted that the chain drive train could be replaced by a flexible rotatable drive shaft that can be located inside the cleaning shoe.

If the frame 46 of sieve 40 or 42 is to be disassembled from cleaning shoe 38 for purposes of repair, inspection or cleaning, only a rear retaining element 60 needs to be removed from the plane of the frame 46. The frame 46 can be pulled rearwardly along side rail 62 on the cleaning shoe 38. The adjustment element 64 is also removed from the cleaning shoe 38 with the frame 46. The gear 68 and the corresponding drive train, however, remain in cleaning shoe 38. The drive connection between the bottom rack 66 of adjustment element 64 and gear 68 is releasable without problem by easy lifting of frame 46 and is reengaged automatically, and with limited play, after reincorporation of the upper sieve 40 and lower sieve 42. As an alternative, the gear 68 can be adjusted downward in order to be able to remove the sieve without problem, if upwardly closed lateral guide rails are present in the cleaning shoe 38.

If the adjustment element 64 is dimensioned to be sufficiently long (or the adjustment bar 54 is designed as a rack), the motor 78 can also be used to eject or insert the lower sieve 42 or upper sieve 40 into the cleaning shoe 38. In this case, the retaining element 60 is removed and the motor 78 is rotated, so that the gear 68 rotates clockwise in FIG. 2. The blades 44 are initially brought to the open position, until the adjustment bar 54 engages on a stop (not shown) on frame 46. The frame 46 is now pushed out rearward from the cleaning shoe 38 by the adjustment element 64 driven by the gear 68. In order to avoid jamming of frame 46 in cleaning shoe 38, roller-mounted guides can be provided between cleaning shoe 38 and frame 46.

Insertion of frame 46 occurs in the opposite manner, in which the adjustment element 64 will first pull the adjustment bar 54 to a stop corresponding to the closed position of blades 44 before the frame 46 is retracted into cleaning shoe 38.

In order to achieve a situation in which the blades 44 assume a defined position at a specific position of gear 68, corresponding marks can be made on the gear 68 and adjustment element 64. The operator adjusts the blades 44 and the adjustment bar 54 with the drive connection released between gear 68 and rack 66 (for example, with the raised frame 46 or lowered gear 68), so that the marks coincide. This achieves a situation in which the blades 44 have a known position corresponding with a known position of motor 78. Instead of marks, mechanical devices (for example, double teeth) can be provided that permit engagement of the gear 68 into rack 66 only at a defined position. If corresponding sensors (light barriers, ultrasonic sensors, etc.) are present that can determine the actual sieve opening, the described expedients are unnecessary.

It should be noted that (as an alternative to the aforementioned mechanical solution) information concerning the corresponding position of blades 44 can be fed to an automatic control or regulation device for sieve opening. This information can be obtained via a corresponding sensor, arranged, for example, on the cleaning shoe 38 or frame 46, which cooperates with the adjustment bar 54 and determines its position. For example, a movable potentiometer can be used whose slide cooperates with the adjustment bar 54. It is also conceivable to drive the motor so that it moves the blades 44 in the direction of their open or closed position. Reaching of the stop by the adjustment bar 54 in the open or closed position is recognized by an increased motor operating current (based on blocking of the adjustment bar 54 by the stop). The motor can then be placed in the operating mode for a predetermined time corresponding to the desired position of blades 44, if a DC motor is used. A stepping motor can also be used, which is operated by drive signals according to the desired position of the blades 44. Another conceivable possibility is the use of a motor 78 with a built-in sensor that is calibrated between the end positions.

Having described the preferred embodiment, it will become apparent that various modifications can be made without departing from the scope of the invention as defined in the accompanying claims.

What is claimed is:

1. A cleaning assembly for an agricultural combine having a cleaning shoe, the cleaning shoe being provided with at least one sieve that is removeable from the cleaning shoe, the sieve having a frame that is provided with adjustable blades, the adjustable blades are adjusted by an adjustment element, the adjustment element being mounted to the frame, a drive element for driving the adjustment element is mounted to the cleaning shoe, whereby the sieve can be readily removed from the cleaning shoe, a drive connection extending between the drive element and adjustment element is automatically disengaged when the sieve is removed from the cleaning shoe and automatically engaged when the sieve is inserted into the cleaning shoe, the drive element can move the adjustment element in two directions.

2. A cleaning assembly as defined by claim 1 wherein the drive element is a gear and the adjustment element is a rack that cooperates with the gear.

3. A cleaning assembly as defined by claim 2 wherein the adjustable blades extend transversely and are connected to an adjustment bar that extends axially, the adjustment element being arranged to move the adjustment bar axially.

4. A cleaning assembly as defined by claim 3 wherein the rack is toothing mounted on the adjustment bar.

5. A cleaning assembly as defined by claim 4 wherein the toothing is integral with the adjustment bar.

6. A cleaning assembly as defined by claim 4 wherein the drive element is driven by an electric motor.

7. A cleaning assembly as defined by claim 4 wherein the drive element is driven by a hydraulic motor.

8. A cleaning assembly as defined by claim 4 wherein the drive element comprises the gear and a rotatable shaft that connects the drive element to a motor through a drive train, the gear and drive shaft are arranged within the cleaning shoe, and that the motor and the drive train are arranged outside the cleaning shoe.

9. A cleaning assembly as defined by claim 8 wherein a removable retaining element is arranged to trap the frame in the cleaning shoe and the sieve can be removed rearwardly from the cleaning shoe after the retaining element is removed.

10. A cleaning assembly as defined by claim 9 wherein the sieve is pushed out of the cleaning shoe and retracted into the cleaning shoe by the drive element.

11. A cleaning assembly as defined by claim 10 wherein the adjustment element cooperates with a stop in the open and closed position of the adjustable blades.

12. A combine comprising:
- a support structure;
- a threshing assembly mounted to the support structure for threshing a harvested crop;
- a separating assembly mounted to the support structure for separating grain and chaff from a threshed crop;
- a cleaning assembly mounted to the support structure for cleaning chaff from grain, the cleaning assembly having a blower and a cleaning shoe, the cleaning shoe being provided with at least one sieve, the sieve having a frame with adjustable blades, the sieve being removeable from the cleaning shoe, the adjustable blades are adjusted by an adjustment element, the adjustment element being mounted to the frame, a drive element for driving the adjustment element is mounted to the cleaning shoe, whereby the sieve can be readily removed from the cleaning shoe, a drive connection extending between the drive element and adjustment element is automatically disengaged when the sieve is removed from the cleaning shoe and automatically engaged when the sieve is inserted into the cleaning shoe, the drive element can move the adjustment element in two directions.

* * * * *